United States Patent Office 3,517,544
Patented June 30, 1970

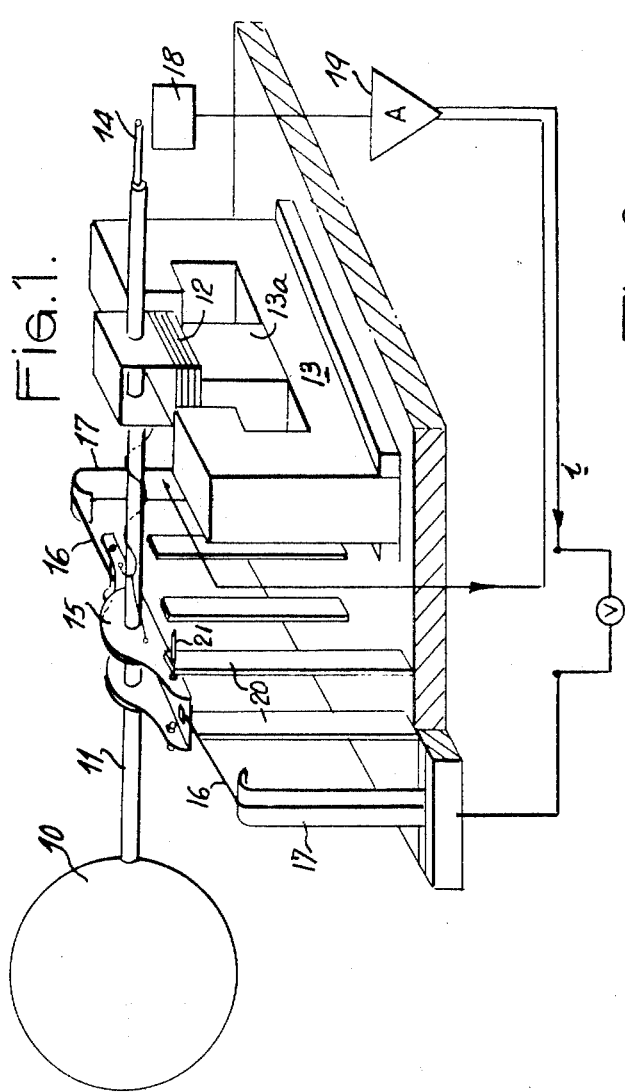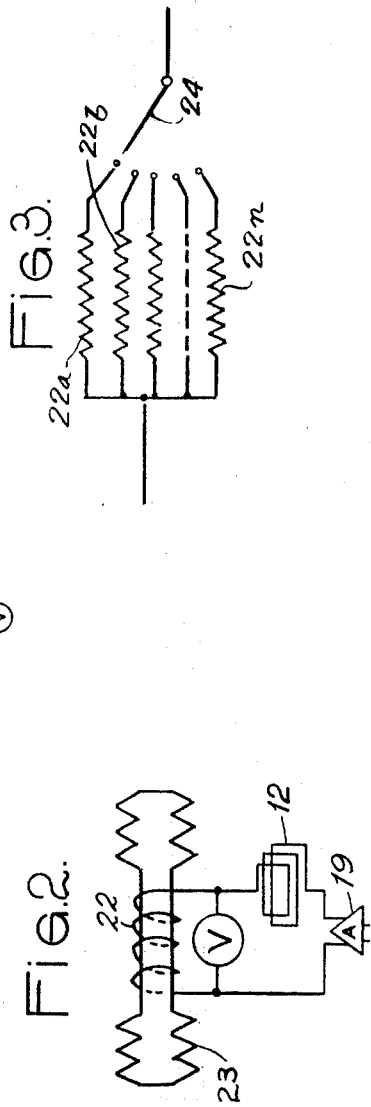

3,517,544
GAS PRESSURE MEASURING DEVICE
Sylvain Jean Janssen, Paris, France, assignor to Compagnie des Compteurs, Paris, France, a company of France
Filed Feb. 6, 1967, Ser. No. 614,270
Claims priority, application France, Feb. 8, 1966, 48,778
Int. Cl. G01n 7/00, 9/02
U.S. Cl. 73—30                                3 Claims

ABSTRACT OF THE DISCLOSURE

The device comprises a balance with a beam with a hollow globe at one end, a coil at the other end, the assembly is immersed into the gas whose pressure is to be measured; the coil is fed by a counterbalancing current through a resistance whose potential difference at the terminals corresponds to the pressure of the gas.

---

The present invention relates to a gas pressure measuring device utilizing an automatic counterbalancing power balance.

It is already known to measure the specific weight of a gas by means of an automatic counterbalancing power balance provided with an undeformable plunger immersed in the gas to be measured and subjected to the Archimedean forces developed by this gas. It is known that in this kind of device the balance-restoring force of the balance is obtained by means of a magneto-electric motor whose mobile frame is traversed by a current $i$ proportional to the specific weight of the gas being so $i=k\rho$, $i$ being the current supplied by the subjection associated with the balance, $\rho$ the specific weight of the gas and $k$ a constant depending on the geometrical shape of the balance. A measuring device for specific weight of this kind is described in patent application Ser. No. 610,518, filed by the application on Jan. 20, 1967.

The present invention has the object of enabling such power balance to be utilized as a manometer.

According to the invention, the device for measuring the pressure of various gases comprises a power balance composed of a rigid beam, a non-deformable hollow plunger carried by one side of the beam, an electromagnetic coil fed with electric current and carried by the other side of the beam, a fixed magnetic circuit cooperating with said coil, means for detecting the position of the beam and controlling the supply of electric current of said coil so that the latter is kept in equilibrium whatever the pressure of the gas in which said balance is placed, at least one resistance inserted in series with said coil so that this resistance is traversed by the supply current of said coil and means for measuring the potential difference existing at the terminals of said resistance. By selecting a resistance which has a temperature coefficient equal to the coefficient of the increase of constant volume pressure, one can deduce from this the value of the pressure by measuring the potential difference at the terminals of the resistance when equilibrium of the balance is restored.

Various other characteristics of the invention will moreover be revealed by the description which follows, as well as by the accompanying drawing, showing an example of embodiment.

FIG. 1 is a perspective view of one mode of embodiment of the device of the invention.

FIGS. 2 and 3 are diagrams showing embodiment details of certain parts of the device of FIG. 1.

The invention takes advantage of the analogy between the variation laws of an electric resistance $r=r_0(1+\alpha t)$ and increase of pressure of a gas of constant volume $p=p_0(1+\beta t)$ as a function of temperature.

For this, I make a balance formed, for instance, as shown in FIG. 1, i.e., comprising a very light hollow globe 10, hermetically sealed, on which the Archimedean thrust is exerted created by the gas into which this globe is immersed, as well as the other mechanical elements of the balance. The globe 10, preferably of glass, crystal or other vitrified material, is mounted at one of the ends of a tube 11, preferably of the same material as the globe. The tube 11 forms the beam of the balance whose mass must be as slight as possible.

A mobile coil 12, carried by the free side of the beam 11, can be moved in the airgap of a magnetic circuit 13 advantageously comprising a permanent magnet 13a. The coil and the magnetic circuit form an electro-magnetic balance restoring motor. A position deviation detector 14 of known type (optic, magnetic, etc.) provides at the input 18 of a subjection circuit, a deviation signal to an amplifier 19. The amplifier 19 sends into the coil 12, a current $i$ tending to restore the balance of the beam 11.

The mobile assembly comprising the elements 10, 11, 12, 14, is carried by a metal cradle 15, of stainless steel for instance, which is supported by torsion tapes 16, stretched horizontally between two springs 17 ensuring the tension of the tapes 16 so that their sag is practically zero. Preferably, the tapes 16 are also used for conveying the current to the coil 12. Small plates 20 with rods 21 are provided for limiting the clearance of the cradle 15 which forms the fulcrum of the balance.

The balance for measuring gas pressure also comprises, in the circuit of the coil 12 of the electro-magnetic balance restoring motor, a resistance 22 with a temperature coefficient $\alpha$ which is selected for being equal to the coefficient of the increase of constant volume pressure $\beta$ of the gas to be measured.

The current $i$ ensures the counterbalancing of the balance and is obviously not modified when the resistance $r$ is inserted in the circuit of the coil 12 whatever the value of this resistance. However, there appears necessarily at the terminals of this resistance $r$ a potential difference readable on the voltmeter V:

$$U = r \cdot i \tag{1}$$

As at equilibrium, and as stated hereinbefore, $i$ being proportional to the specific weight of the gas, one may write:

$$U = rk\rho \tag{2}$$

As known, the resistance $r$ of 22 varies with temperature according to the law:

$$r = r_0(1+\alpha t)$$

in which $\alpha$ is the thermal coefficient of expansion of said resistance 22.

Now, by selecting a particular resistance whose coefficient $\alpha$ is equal to the coefficient $\beta$ of the pressure increase with constant volume of the gas the pressure of which is to be measured one obtains $$r = r_0(1+\beta t)$$

and the relation 2 may be written:

$$U = r_0(1 \text{ to } \beta t)k\rho$$

In particular, if one takes, for sake of simplification, the value of $\beta$ which corresponds to perfect gases:

$$\beta = \frac{1}{273}$$

one obtains then:

$$U = r_0\left(1+\frac{t}{273}\right)k\rho$$

Such a relation can be written:

$$U = \frac{k}{273} r_o \rho T = K r_o \rho T$$

where T is the absolute temperature and K a constant, which, like $k$ depends only on the geometrical characteristics of the balance, the relation which links $k$ to K can be put down as $$K = \frac{k}{273}$$

Comparing this expression with that given for the pressure of perfect gases; it comes about that $$p = \rho \frac{R}{M} T = K' \rho T$$

where R is the constant of the perfect gases, M the molecular mass of the gas and K' a constant which only depends upon the gas. It is seen that the two expressions of U and $p$ are quite analogous, to within a factor, and that provided that the plunger 10 and the resistance are at the same temperature, one obtains for a given gas $$p = k'' \frac{U}{r_o}$$

relation in which $$K'' = \frac{K'}{K}$$

By selecting the resistance $r$ so that its temperature coefficient $\alpha$ is equal to the coefficient of the pressure increase of the gas with constant volume $\beta$, one can, consequently, deduce from this the value of the pressure by measuring the potential difference U at the terminals of said resistance when the equilibrium of the balance is restored, and this, whatever the temperature value.

As is known, gases and 'a fortiori' vapours, do not rigorously comply with the theory of perfect gases, but, in actual practice, it is always possible to combine, in series or in parallel, conductor wires with different temperature coefficients, so as to obtain an aggregate resistance having the same $\alpha$ temperature coefficient as the $\beta$ coefficient of a given gas. As it is indispensable that the thermic balance between resistance and gas is ensured at every moment, the resistance 22 be advantageously coiled, as shown in FIG. 2, on a radiator 23 of good heat conducting material and having a large heat exchange surface with the gas. The heating of the radiator, due to the passage of the current in the resistance, should be negligible, i.e., $i$ and $r_o$ should be slight.

In order to make the balance utilizable for measuring gas pressures of different kinds, as shown in FIG. 3, several resistances 22a, 22b ... 22n, respectively having the $\alpha$ temperature coefficients equal to the $\beta$ pressure increase coefficients of these various gases, can be selectively changed over by way of a switch 24 to be connected up in the circuit of the coil 12 of the balance-restoring motor.

In this case, it is interesting to retain, between the potential difference U and the pressure $p$, a constant proportion factor whatever the gas to be measured. To this end, for each gas the corresponding resistance is selected so that in addition to the equality of the coefficients $\alpha$ and $\beta$, one also has $$r_o = \frac{R}{KM}$$

M representing the molecular mass of the gas whose pressure $p$ is to be measured. Consequently, one obtains:

$$U = r_o K \rho T = \frac{R}{M} \rho T$$

an expression which is the same as that of the pressure $p$, so that $p = U$, the pressure of the gas can thus be directly read on a voltmeter V placed on the terminals of the resistance $r$.

I claim:

1. A device for measuring the pressure of various gases at any temperature comprising a power balance including a pivotally mounted rigid balance beam, a non-deformable hollow plunger carried by said beam at one side of the pivot axis and located within the gas whose pressure is to be measured, an electro-magnetic coil carried by said beam at the other side of the pivot axis, a stationary magnetic circuit cooperative with said coil, said coil and magnetic circuit constituting a balance restoring motor of the electro-magnetic type, a control circuit for supplying said coil with electric current, means for detecting the out of balance position of said beam and controlling the supply of electric current over said control circuit to said coil in accordance therewith so as to effect a rebalance of said beam regardless of the pressure level of the gas, at least one fixed resistance inserted in series with said coil in said control circuit, said resistance having a temperature coefficient equal to the coefficient of the increase in pressure of the gas being measured at constant volume, a heat radiator supporting said resistance, said radiator having a large surface in heat exchange relation with the gas being measured to assure constant thermic balance between the resistance and the gas at all gas temperatures, and means for measuring the potential difference existing at the terminals of said resistance when said beam is rebalanced.

2. A pressure measuring device as defined in claim 1 and which includes a plurality of said fixed resistances connected electrically in parallel, and switch means cooperative therewith for selectively connecting one of said resistances into said control circuit in series with said coil, each said resistance having a different temperature coefficient and corresponding respectively to the coefficient of increase of constant volume pressure of the particular gas desired to be measured.

3. A pressure measuring device as defined in claim 2 wherein the resistance value $r_o$ of each of said resistances when no current traverses them is selected according to the relation $$r_o = \frac{R}{KM}$$

wherein:

R is the constant of the perfect gas
M is the molecular weight of the gas being measured, and
K is a constant coefficient.

References Cited

UNITED STATES PATENTS 1,707,822   4/1929   Stock _____ 73—30

RICHARD C. QUEISSER, Primary Examiner
JOHN K. LUNSFORD, Assistant Examiner

U.S. Cl. X.R.
73—398